United States Patent [19]

Benedict et al.

[11] 3,822,655
[45] July 9, 1974

[54] LAWN CONDITIONING VEHICLE

[75] Inventors: Dale Gene Benedict; Louis Richard Blasi; Lowell G. Wilson, all of Marysville, Ohio

[73] Assignee: The O. M. Scott & Sans Company, Marysville, Ohio

[22] Filed: June 5, 1972

[21] Appl. No.: 259,441

[52] U.S. Cl............... 111/1, 111/11, 172/154, 172/705, 172/604
[51] Int. Cl............................................ A01c 5/00
[58] Field of Search............. 111/1, 10, 11, 6, 7, 85, 111/87; 172/154, 158, 184, 705, 604, 660, 491, 187, 462

[56] References Cited
UNITED STATES PATENTS

| | | | |
|---|---|---|---|
| 2,757,596 | 8/1956 | Adels | 172/604 X |
| 3,247,812 | 4/1966 | Luciano | 111/1 |
| 3,446,165 | 5/1969 | Magda et al. | 111/11 |
| 3,544,013 | 10/1969 | Dorfman | 111/11 X |
| 3,685,468 | 8/1972 | Paige | 111/11 |

*Primary Examiner*—Stephen C. Pellegrino
*Attorney, Agent, or Firm*—James B. Raden; Marvin M. Chaban

[57] ABSTRACT

A self-contained, motorized riding vehicle is disclosed which provides a unitary apparatus for performing a series of operations on a lawn simultaneously. The unit has its own motor drive and has a plurality of operative implements such as an alignment of spiking members and an alignment of lawn slicing members. Also provided are a plurality of storage hoppers dispensing in a spread pattern solid or granular materials such as seed pesticide and feeding agents. The unit also has a pressurized liquid storage and dispensing system. All these operative components can be controlled individually from the driver's compartment of the vehicle. In operative sequence, from front to rear, are located the earth perforating or spiking members and earth slicing members. Rear of these members is a nozzle for discharging the liquid in a transverse pattern the full width of the vehicle body. Rearmost is a common spreader outlet from the discharge of the two hoppers to comingle solid materials discharged from these hoppers, such as seed granular nutrients and/or weed-killing materials.

8 Claims, 8 Drawing Figures

LAWN CONDITIONING VEHICLE

BACKGROUND OF THE INVENTION

Many forms of lawn working implements are known in the prior art as are many forms of spreaders and the like. In some cases, one or more of these implements have been joined together and mounted on a trailer structure adapted to be pulled by a tractor or other powered vehicle. Such trailers may have a combination of implements such as spikers, rollers and spreaders. To permit control of the trailer implements from the tractor requires the use of disengageable interconnecting controls between the tractor and the detachable trailer. The resulting tractor and trailer combinedly form a comparatively long vehicle, requiring turns of considerable radius, with the combined rig having a decided lack of maneuverability.

SUMMARY OF THE INVENTION

The present machine is designed and equipped to perform a plurality of specific operations and applications necessary to upgrade and improve lawns as well as to maintain them. The machine is unitary in construction and adapted to be driven by a riding operator. The unit is compact and is self-motorized, to allow greater mobility. It is equipped with earth perforating spikers for aerating (and to some degree, for providing a lodging place for seed), serrated discs for slicing and opening up the old turf so that deposited seed comes in close proximity with the soil to insure germination and development of the seed into grass. The earth slicing members are positioned intermediate the perforations made by the spiking members and together the spikers and slicers fracture and puncture an area of lawn or earth in a regular pattern, thereby alleviating soil compaction.

The machine is equipped with a pressurized liquid pump for feeding liquid from a tank to a nozzle attachment for moistening a lawn prior to application of the granular weed killing materials and seed. In this tank, water may be mixed with a foaming solution. As the mixture is sprayed from the nozzle, it will remain on the grass for several minutes, providing greater adherence of dry granular weed controlling agents to the lawn while at the same time the foam remains visible to serve as a marker observable during the next pass to insure proper overlap and to eliminate missed streaks.

In addition, some advantages of the vehicle are as follows: The fractures caused by the spiker alone provide a limited number of fractures whereas a combination of transversely spaced slices in addition to the spike punch openings tend to produce a regular pattern of closely spaced soil openings in the area of a pass of the vehicle. Further, the overall length of the machine is maintained at a minimum and the maneuverability is increased. The machine can turn on a short radius to fully cover the area being treated.

It is, therefore, an object of the invention to provide a self-contained, motorized lawn-treating riding vehicle having a plurality of operational lawn conditioning implements controllable by the driver during operation thereof.

It is a further object of the invention to provide a lawn treating machine having in operating sequence the following implements: a lawn spiker, a lawn slicer, a liquid dispenser and a spreader for releasing granular material from a plurality of hoppers, all or any combination of these implements being usable at any particular instance.

It is still a further object of the invention to provide a unitary lawn treating vehicle which has a plurality of transversely spaced earth spiking members, and spaced between said members there is provided a plurality of lawn slicing members, the slicing members positioned to slice an area after the spiking members have passed that area, and thereby provide a plurality of transversely spaced earth punctures.

DETAILED DESCRIPTION OF THE DRAWINGS

Figure 1:
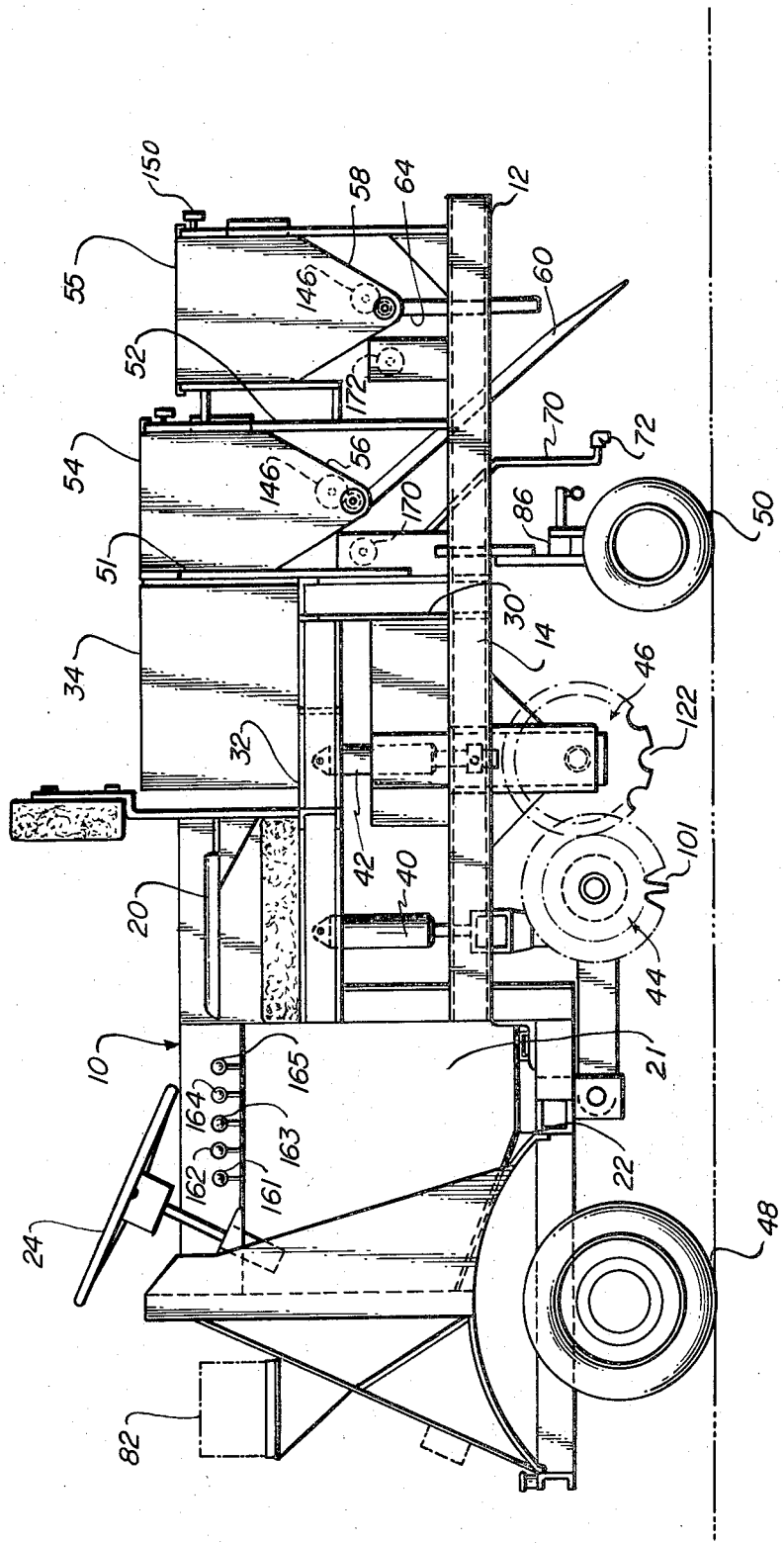
FIG. 1 is an elevational view of the left side of a vehicle according to the invention.
Figure 2:
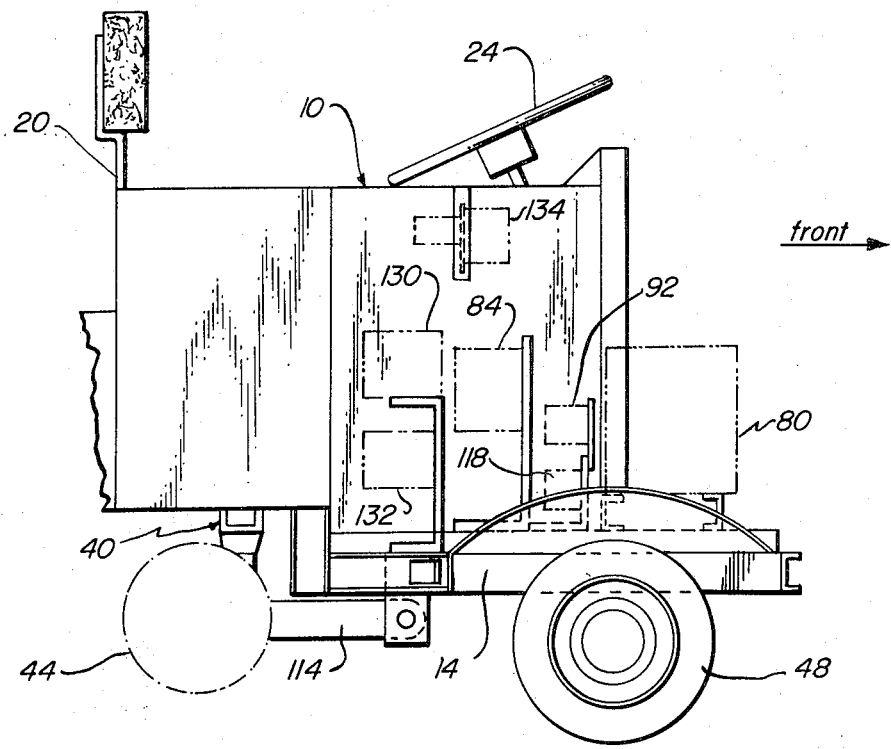
FIG. 2 is a partial right side view in elevation of the vehicle of FIG. 1.

Turning to FIG. 1, there we show a self-contained riding lawn conditioning vehicle 10 according to the invention. We have found that a vehicle with a body approximately three feet wide and eight feet long may accomodate the features shown. At its front end the vehicle has a self-contained gasoline engine and controls area, a driver's compartment and has toward its rear the implements area. The implements area includes a main longitudinal extending frame, or bed 12, including the side frame members 14 supporting the operative elements.

The drive and control area to be described later, is suitably grouped about the operators compartment embodied by the drivers seat 20 and leg space 21, and including controls area 22 and steering wheel 24.

Adjacent the front of the vehicle are uprights 30 joined to the main frame 12. These uprights 30 serve as a base for a horizontal support beam 32 on which the driver's seat is supported. At the rear of the driver's seat is mounted a closed liquid tank 34. Secured to depend from beams 32 are vertically acting cylinders 40 and 42 for respectively controlling the elevation and lowering of a spiker assembly 44 and a slicer assembly 46. This spiker assembly is positioned approximately midway between the front and rear wheels 48 and 50 respectively. The spiker assembly 44 has interleaved therewith slicer assembly 46, both shown in the raised or inoperative position in FIG. 1.

At the rear of tank 34 are mounted a pair of spaced apart upright supports 51 and 52 between which is mounted a first open trough storage hopper or spreader storage container 54. To the rear of storage hopper 54 is a second open trough storage hopper 55. Both hoppers or containers have internal agitators (not shown) to stir the particulate matter in the hopper for even distribution therefrom, as is well known in the spreader arts. Both hoppers have V-shaped bases 56 and 58, as viewed from the side of the vehicle, the bases 56 and 58 each being provided with a transverse linear spreader opening (not shown) as is well known in the art.

From the base of forward storage hopper 54, there extends a rearwardly inclined chute 60 which receives the discharge from both storage hoppers 54 and 55. A rear wall 64 parallel and below the rear inclined base wall 58 of the rear storage hopper 55 serves to channel the discharge from the rear storage hopper into chute 60.

A lawn to be conditioned by the vehicle may be treated with a wetting agent such as water and suitable liquid soil treating agents dispensed under pressure from the closed liquid storage tank 34. An outlet tube 70 from the storage tank leads to a nozzle 72 configured to distribute the output liquid in an essentially rectangular transverse pattern approximately equal to the width of the vehicle. Nozzle 72 is located to the rear of rear wheels 50 so that the nozzle discharge pattern at its forward end will strike the ground surface or lawn rearward of the rear wheels. The rearmost extent of the distribution pattern of the liquid will terminate prior to the front of the discharge from the solid material secondary chute 62. The nozzle is positioned at height relative to the ground level slightly lower than the relative height of the outlet of the chute to insure that the soil is wetted and not the granular materials dispensed.

Liquid additives may be mixed with a basic liquid such as water, so that a visible mark is temporarily deposited on the turf. This visible mark enables the vehicle driver to discern the transverse or lateral extent of a pass so that the vehicle may readily be aligned for the next pass with minimum overlap and avoidance of missed areas. Such additives may be in a form of the type which foams to form a layer which will remain on the lawn for several minutes to provide a greater adherence of the granular materials to the turf. Alternatively, the liquid may be lawn colorant.

For powering the vehicle and its powered implements, we use a gasoline internal combustion engine 80 mounted on the front of the vehicle. Electric drive of the type used to power golf carts might also be used, but it is not preferable. With the type of drive shown, a combined starter and generator using a conventional starting battery 82 is employed. The gasoline engine 80 is used to power a plurality of hydraulic systems, as will be described. The controls and motors driven by the engine comprise separate hydraulic systems for the various conditioning implements.

The propulsion of the vehicle is effected by hydraulic wheel drive motors (not shown), both for forward drive or for reverse movement. These motors are driven by a single hydraulic pump 84 which, in conjunction with a pressure control sensing system (not shown), gives the effect of differential drive. This unit may have a 4-wheel drive.

For steering the vehicle, a power steering hydraulic system is used, with a single hydraulic cylinder 90 powered by a power steering pump assembly 118. By proper combination of the rear axle gearing, and hydraulic controls, the vehicle can be designed to turn in a radius of less than 8 feet and thereby provide a maneuverable, easily-handled vehicle.

Figure 5:
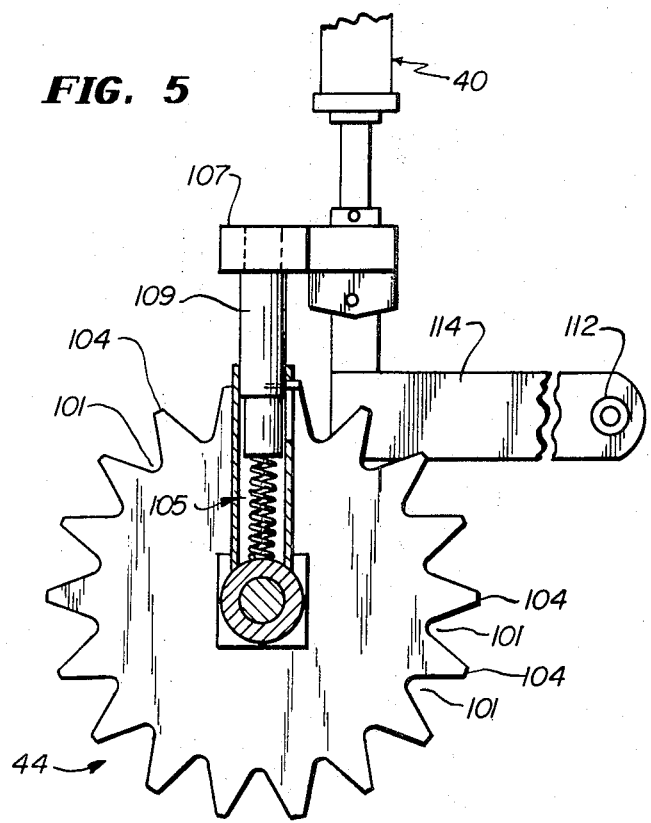
FIG. 5 is a side view in elevation of the spiker member of FIG. 1 and its operative controller.
Figure 6:
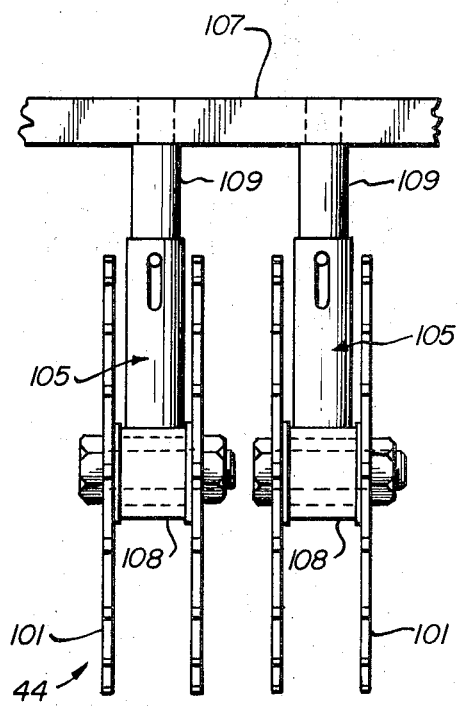
FIG. 6 is a sectional view taken along line 6—6 of FIG. 5.
Figure 8:
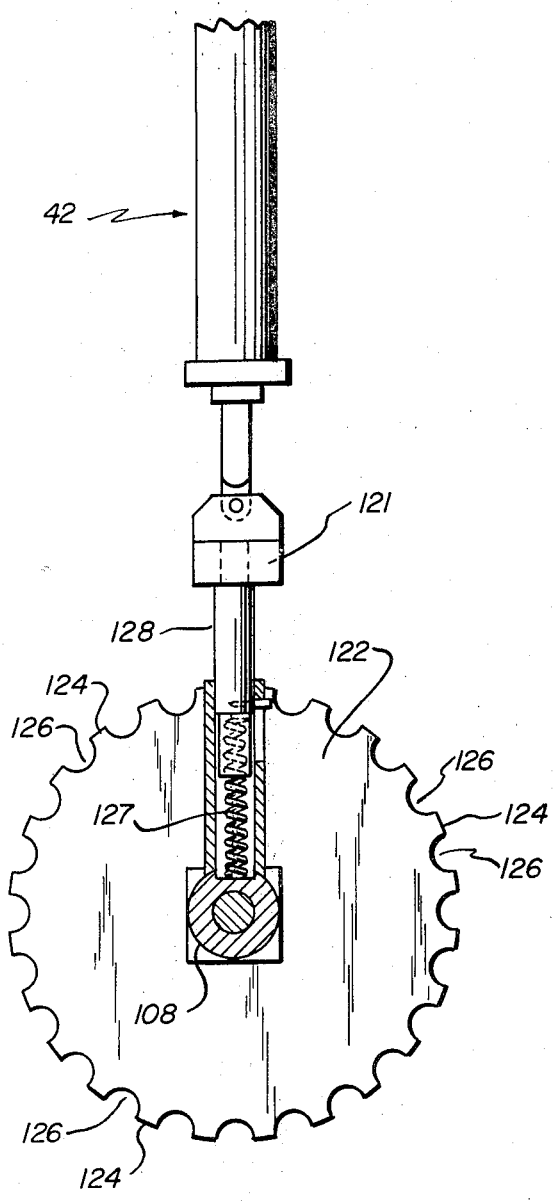
FIG. 8 is a side view in elevation of the slicer member of FIG. 1 and its operative controller.
Figure 7:
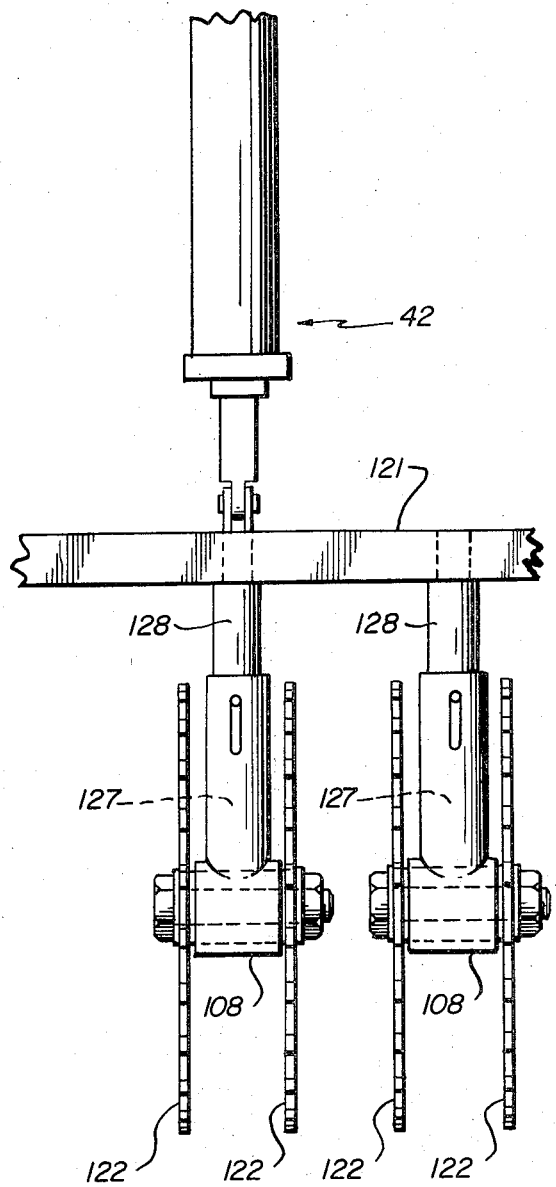
FIG. 7 is a partial view in section taken along line 7—7 of FIG. 5.

Now, turning to the implements themselves, in FIGS. 5 and 6 within assembly spiker 44, are shown a plurality of cold rolled steel spiker wheels 101. In one design form found satisfactory, each spiker is fabricated as an integral part of the periphery of a wheel having a reference outside diameter of 11 inches. Each spiker wheel 101 in this design has 18 teeth 104, each point being 1½ inch long in a radial sense and having a 20° taper. The spiker wheels 101 are mounted in pairs with a suitable hub therebetween, each hub having a tubular upstanding shaft 109 with lost motion connection to a lateral mounting bar 107. The tubular connection includes individual spring loaded assemblies 105 to enable the spikers to follow uneven turf contours with greater effectiveness. The spiker wheels are mounted to rotate in individual longitudinal planes and are transversely spaced apart to cover the lateral spread of the vehicle. A spacing of approximately two inches between adjacent spiker wheels along the lateral shaft has been found to produce sufficient depressions in the soil as the vehicle moves. The carriage system for the assembly 44 includes two sealed roller bearings (not shown) and two arms 114 pivoted from the main frame 12, raised and lowered by a hydraulic pivotally mounted piston reciprocatory in cylinder 40, powered by the single auxiliary pump 118 to raise and lower bar 107 and to move the spikers accordingly. Assembly 44 is activated by manually setting a single valve into a reverse position. The fluid in the system is forced to the rear port of the cylinder 40 thereby pushing the assembly downward. By setting the valve in a reverse position, fluid is forced to the forward port thus raising the cylinder. Mounted between the valve and cylinder is a pressure regulating valve (not shown) providing a pressure of 0 to 3,000 P.S.I. The spiker assembly 44 is spring loaded to essentially float and follow uneven ground contours.

The individual slicer discs 122 are mounted in pairs on individual assemblies, the slicer discs being spaced between the spiker wheels 101 and having any suitable clearance spacing therebetween. Each slicer disc has its periphery serrated with peripheral ridges 124 of approximately 1 inch separated by indentations 126 of approximately 1 inch so that the periphery is approximately 50 percent interrupted by the regular indentations. Each slicer assembly contains two sealed ball bearings (not shown) eliminating grease fittings. Each slicer pair is spring loaded by means of a compression spring 127 and lost motion connection within individual connecting arms 128. The connecting arms 128 are affixed in parallel to a lateral mounting arm 121, raising and lowering of the arm being controlled by a piston within vertical acting cylinder 42. The spring loading enables the slicing mechanism to essentially float and follow uneven turf contour with greater effectiveness.

The liquid dispensing system for nozzle 72 includes a pressurized water pump 130 operated by a hydraulic motor 132 driven by the single auxiliary pump and energized by actuating valve 134 into the open position. The liquid tank 34 used for this system may be constructed of stainless steel capable of holding at least 25 gallons of liquid. This pump and liquid system will apply the foam for wetting the ground or lawn and also provides residual visual indications to serve as a marking system.

This machine is equipped with the two dispensing spreaders or storage hoppers 54 and 55, these hoppers being of any suitable type generally available. Preferably, the spreader hoppers are constructed of stainless steel. Both hoppers have agitators. The agitators of both hoppers may be coupled together for common movement. The shut-off bars 140 of each are grouped by hydraulic systems and are closed by spring return. Both hopper spreaders and agitators are driven by two individual fluid motors 172 powered from a single auxiliary pump 118. Flow control valves are installed between pump and motors to control the speed of rotation of the agitators.

Figure 3:
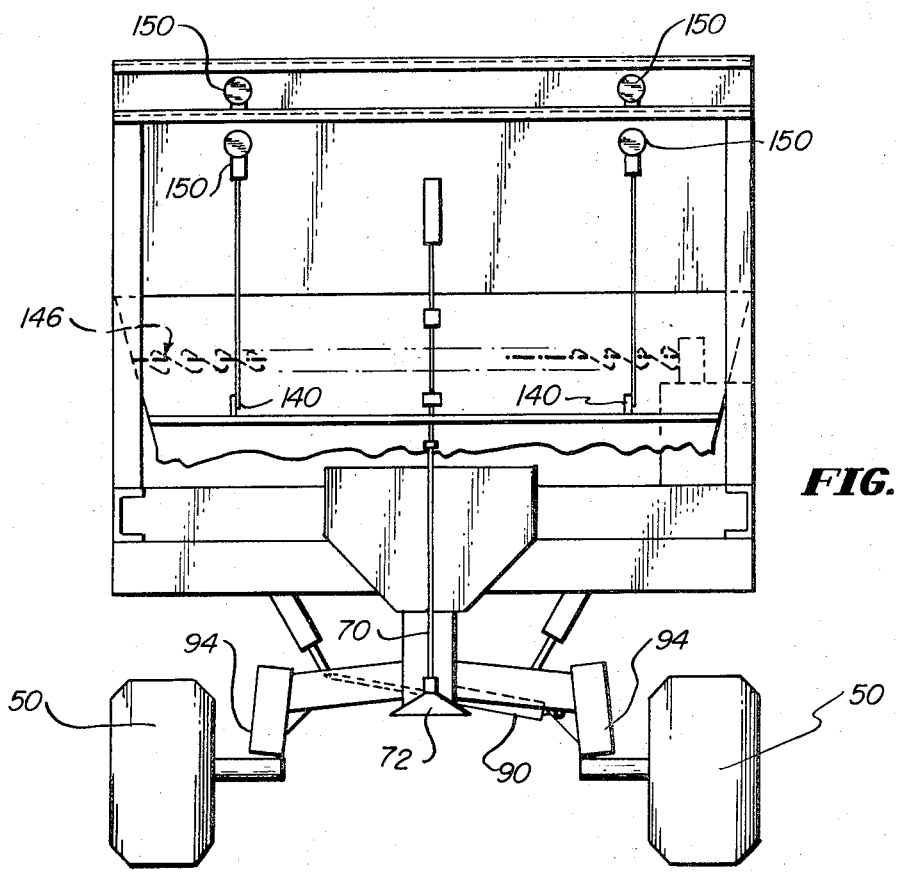
FIG. 3 is a rear view in elevation of the vehicle of FIG. 1.

These hoppers are activated by throwing a single valve into open position allowing fluid to flow within the hydraulic control system. Both hoppers can be operated to dispense material simultaneously or just one at a time. The flow of hydraulic fluid is so directed that the shut off bar is opened at the same time that the agitator motor is energized. Both hoppers have manually settable adjustment knobs 150 for the dispensing openings, the adjustment knobs 150 being accessible from the rear of the vehicle as shown in FIG. 3.

Controls for the five operable implements are located in a position accessible to the driver or operator and include manually operable controls in the form of hand levers shown in alignment in FIG. 1: 1) a control 161 for the lowering or raising of the spiker assembly; 2) a control 162 for lowering or raising the slicer assembly; 3) a control 163 for operating the liquid dispenser continously; 4) a control 164 for opening the dispensing chute of the foward hopper; and 5) a control 165 for operating the rear hopper. The controls may be hand levers, as shown, or foot pedals as desired.

The operation of the vehicle is as follows:

To start the gasoline engine 50, the operator turns the ignition key located on his dashboard to energize the 12 volt starter-generator combination and start the gasoline engine.

To move the machine forward or reverse, the operator operates the foot-operated pedal for forward or for reverse motion of the vehicle. By constantly depressing the foot control, the propulsion motors are engaged which starts and maintains the forward motion of the vehicle. Releasing the foot pressure on the foot control brings the vehicle to a disengaged neutral position which serves to brake the vehicle. Foot pressure applied to these controls engages the individual hydraulic fluid propulsion system, which in turn propels the front wheels forward or in reverse.

For steering, the operator turns the steering wheel 24 to right or left in the fashion of an automobile to provide turning control for the vehicle. The hydraulic system for the steering operates independently of the remaining hydraulic systems. Once the engine has been started, the hydraulic steering system is operable through cylinder 90 and pump 118. Hydraulic steering requires little effort on the part of the operator measurably aiding in turning and maneuvering the machine on lawns.

Figure 4:
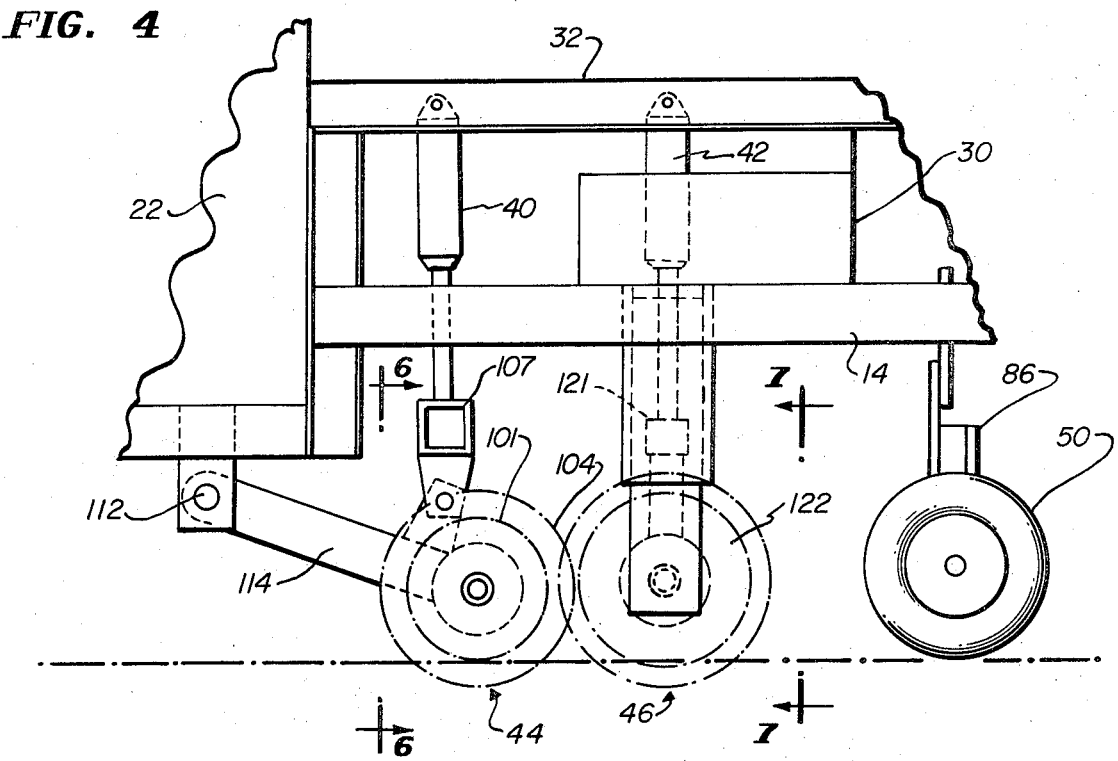
FIG. 4 is a partial side view in elevation of the intermediate portion of the vehicle of FIG. 1, with the spiker and slicer shown in the operative position.

The spiker assembly is activated in response to operation of the spiker control lever 161 within the drivers compartment. Pulling back on the spiker lever engages hydraulic cylinder 40 which, in turn, lowers the spiker assembly and brings it into contact with the lawn as shown in FIG. 4. By pushing the spiker control lever forward, the spiker assembly is raised off the lawn into the inoperative position of FIG. 1. To maintain this unit in a raised position, the spiker control lever is moved to neutral position.

The amount of downward pressure exerted by the spiker is controlled by a Pressure Regulator Valve. This valve can be set to adjust the amount of downward pressure exerted by the spikers, since some turf will require more downward pressure than other turf due to dryness, soil structure, etc. This control setting, therefore, provides flexibility in permitting the adjustment of the spiking pressure required to fracture and spike soil of varying hardness and at varying required depths. The spikers are spring loaded to give a floating action. This loading permits the spikers to follow the contour of the turf thereby assuring that low spots in the turf will be spiked as well as high spots.

The slicing disc assembly is controlled in a similar fashion, responsive to the operation of a slicer control handle 162. The serrated discs are spring loaded to give a floating action. This loading permits the discs to follow the contour of the turf thereby assuring that low spots in turf will be sliced as well as high spots.

Both spiker and slicer assemblies can be maintained in operation simultaneously or individually, depending on conditions.

The slicing performed by discs alleviates soil compaction and provides a lodging place and protection for dispensed seed and thereby provides better seeding establishment. The perforations engendered by the spikers aerate the soil to alleviate compaction and at the same time also provide additional perforations to receive seed and other products being applied.

On some lawns, the need for slicers and spikers will not be required. Accordingly, these units can be left disengaged and the machine used solely for the application of products such as fertilizer, weed controls, etc.

Liquid dispensing is controlled by a third control lever 163. A pump for the liquid dispensing system is activated by pulling back on liquid control lever. This movement sets a hydraulic motor into motion driving a foam liquid dispensing pump. The foam dispensing pump draws water and foaming agent solution from the water-foam solution tank. This foam solution is discharged under pressure through a jet nozzle. As mentioned previously, this nozzle is located immediately in front of the material flow spout of the spreaders.

The foam serves as a moisturizer to moisten the turf surface just prior to application of products such as weed control agents, seed and fertilizer from the spreaders. The liquid material causes weed control material to adhere to the lawn and permits application of post-emergence weed controls during any time of the day. Without foam spray, use of post-emergence weed controls would be limited to mostly early morning when the lawn or foliage is wet from dew. As a secondary effect, the dispensed foam remains on the foliage for sufficient time to provide a visual indication so that the machine operator can easily see where liquid has been dispensed and the operator can align the vehicle for sufficient overlap to avoid missed streaks.

The spreader of the rear hopper is operated by a further control lever 165. Pulling back on handle 165 engages a hydraulic cylinder and a hydraulic drive motor 172 simultaneously. The hydraulic cylinder opens the shut off bar 140 on the spreader to allow flow of material to the turf. The hydraulic drive motor also sets the hopper agitator in motion. The hydraulic cylinder pressure for the spreader shut off bar is regulated by a pressure control valve. The speed of the hydraulic motor which sets the agitator in motion is controlled by a speed control valve. By using hydraulic speed control the system of the vehicle can provide accurate and precise application of one or more granular products in a desired amount and manner.

The front spreader is engaged by a final control handle lever 164. The action and operation of this spreader is identical to the rear spreader in operating its motor 174, as previously explained above.

Both spreaders can be operated simultaneously to allow application of more than one product at a time. Alternatively, if desired, either spreader can be operated singly independently of the other spreader. As mentioned, the spreaders of both hoppers have a common discharge or material flow spout chute 60.

This spout may be corrugated to prevent any shifting of products that might otherwise result when machine is operated on a slope or incline. Each spreader is equipped with a manually settable rate control knob, as mentioned previously. The operator sets the knob to correspond with the suitable rate setting number prior to operating the vehicle, and the material will be applied accurately and precisely.

The vehicle is normally designed to operate at a speed of 3 mph. If it is desired to increase the speed of the machine from 3 mph to 4 mph when servicing a lawn, the operator can do so without interferring with the precise rate at which the products are flowing through the spreaders by accordingly stepping up the hydraulic motor speed that controls the agitators.

The vehicle as described herein provides a rideable lawn control machine, including a plurality of individually or jointly operable implements in a flexible manner, capable of a wide range of uses, a number of which have been described herein.

We claim:

1. A self-powered riding vehicle for conditioning soil, including a control compartment with a plurality of independently and selectively operable manual controls at said compartment for controlling implements mounted on the structural frame of said vehicle, and in which the implements comprise: an alignment of laterally spaced disc perforators mounted on said vehicle and operable to perforate the soil over which the vehicle passes responsive to actuation of a perforator one of said controls, an alignment of laterally spaced soil slicer discs mounted on said vehicle to make slice incisions in the soil responsive to actuation of a slicer one of said controls, a plurality of particulate matter hoppers mounted on said vehicle rearwardly of said perforators and slicers, individual controls for releasing material from each of said hoppers, a discharge chute common to said plurality hoppers, said discharge chute mounted adjacent the rear of said vehicle and extending substantially across the lateral extent of said vehicle, said discharge chute positioned to release material from said hoppers onto soil previously prepared by selective perforating and slicing performed by said vehicle on the soil having passed beneath said vehicle, and wherein said perforators comprise a first plurality of coaxial shafts spaced transversely across said vehicle, an array of paired, spiked rotatable wheels mounted on said first plurality of shafts, said shafts journaled relative to said vehicle frame for floating vertical movement on a common operating member, said wheels journaled for rotation on movement of said vehicle for generating a plurality of perforations in the soil below said vehicle during movement thereof with said common operating member moved to an operative condition by a perforator one of said controls.

2. A vehicle as claimed in claim 1, in which there is a liquid sprayer system for spraying liquid on the soil being passed over by said vehicle, said sprayer system including a liquid storage compartment with a spray nozzle in communication therewith, said nozzle being mounted on said vehicle forwardly of the chute of said hoppers and rearwardly of said perforators and slicers.

3. A vehicle as claimed in claim 1, wherein said slicers comprise a second plurality of coaxial shafts spaced parallel to the first plurality of shafts, said plurality of slicer discs mounted on said second plurality of shafts in paired relationship, each of said slicer discs having alternate ridged portions and indented portions, each slicer disc aligned between adjacent perforator discs, said slicer discs journaled to rotate on movement of said vehicle and slice the soil between alignments of perforations, and means for biasing said disc shafts on a common operating member for floating movement on obstacles being encountered by said slicer discs.

4. A self-contained and self-powered vehicle adapted to be ridden by a vehicle operator for conditioning a section of earth during a traverse of said vehicle along said earth section, and comprising a plurality of implements mounted on said vehicle and selectively controllable by said operator to effect conditioning of earth passed over by said vehicle, said vehicle including a body frame, said implements including a first and a second alignments of discs mounted under said vehicle across the width thereof, individual means depending from said body frame normally holding the discs of said first alignment and said second alignments in an inoperative position out of contact with the earth below said vehicle, and means in said vehicle positioned to be controlled by said operator responsive to the selection thereof for moving respective ones of said holding means to positions wherein the respective alignments of discs may be moved to position for contact with the earth, said discs in each alignment journaled in pairs for rotation on contact with the earth and during movement of said vehicle, spiking tips arrayed about the periphery of said first alignment of discs to produce parallel alignments of perforations in the earth during rotation of said discs, second alignment of discs with one disc of said second alignment positioned between adjacent ones of said first alignment, a plurality of separated sectors around the periphery of each of the discs of said second alignment adapted to produce elongated slices in the earth, said second alignment of discs comprising paired discs journaled on common paired axles, spring biased means for joining said axles to the disc holding means for said second alignment, and means responsive to the selective operation of the control for said second alignment for moving said second alignment to an active position with said disc sectors in contact with the earth to render said discs individually rotative by said contact with the earth on movement of said vehicle.

5. A vehicle as claimed in claim 4 wherein said alignment of earth slicing discs is mounted rearwardly of said first alignment, said spring biasing means acting on said axles to permit said paired discs of said second alignment to follow the contours of the earth.

6. A vehicle as claimed in claim 4 including a liquid dispensing system, an output nozzle of said system configured to spray a pattern approximately equal to the width of said vehicle, said nozzle positioned rearward of both alignments of discs to spray liquid onto the earth after the discs have passed across the earth, and selectively operable means controllable by said operator for actuating said system to dispense liquid.

7. A vehicle as claimed in claim 6 wherein said system comprises a liquid dispensing network including a closed tank and means for pumping liquid from said tank to said nozzle in response to actuation of the system by the operator.

8. A vehicle as claimed in claim 7, further including a plurality of hoppers for particulate matter mounted on said vehicle at the rear thereof, said hoppers each having an access opening at the top thereof for loading and each having dispensing opening, a spreader plate commonly mounted to receive material from said plurality of hoppers, and disposed across the width of said vehicle, said spreading plate being mounted rearwardly of the spray pattern from said liquid spray nozzle and said plate inclined rearwardly to a termination at a lower level than said nozzle, selectively operable means for selectively opening the outlet in each of said hoppers to dispense particulate matter therefrom to said spreader plate rearwardly of liquid dispensed from said nozzle.

* * * * *